United States Patent [19]

Conway et al.

[11] 4,209,305
[45] Jun. 24, 1980

[54] PROCESS FOR MAKING SUBSTITUTE NATURAL GAS

[75] Inventors: Henry L. Conway; John A. Hargis; Henry J. F. Stroud, all of Solihull, England

[73] Assignee: British Gas Corporation, London, England

[21] Appl. No.: 850,535

[22] Filed: Nov. 11, 1977

Related U.S. Application Data

[63] Continuation of Ser. No. 747,698, Dec. 6, 1976, abandoned.

[30] Foreign Application Priority Data

Dec. 8, 1975 [GB] United Kingdom ............... 50192/75

[51] Int. Cl.² .............................................. C10G 13/30
[52] U.S. Cl. .................................... 48/213; 48/214 A; 48/215
[58] Field of Search ............... 48/213, 197 R, 211, 48/214 A, 215; 252/373; 423/650; 260/676 R, 683.9

[56] References Cited

U.S. PATENT DOCUMENTS

| | | | |
|---|---|---|---|
| 3,400,546 | 9/1968 | Karwat | 423/650 |
| 3,444,099 | 5/1969 | Taylor et al. | 48/197 R |
| 3,688,438 | 9/1972 | Slater et al. | 48/215 |
| 3,740,204 | 6/1973 | Slater et al. | 48/215 |
| 3,836,344 | 9/1974 | Krawitz et al. | 48/211 |
| 3,857,685 | 12/1974 | Lehman | 48/211 |
| 3,870,481 | 3/1975 | Hegarty | 48/213 |
| 3,891,404 | 6/1975 | Weil et al. | 48/213 |
| 3,907,920 | 9/1975 | Starks | 48/213 |
| 3,943,236 | 3/1976 | Green | 48/197 R |

*Primary Examiner*—Peter F. Kratz
*Attorney, Agent, or Firm*—Watson, Cole, Grindle & Watson

[57] ABSTRACT

A process, having high thermal efficiency, is provided for the production of substitute natural gas from fossil fuels such as crude oil, by non-catalytic hydrogenation. High thermal efficiency is obtained by using cryogenic systems for separating hydrogen from (a) the product of the hydrogenation reaction and (b) from products produced by partial oxidation in the production of hydrogen required for the hydrogenation reactions. Other products from the partial oxidation reaction may be used either as fuel or as feedstocks for catalytic steam reforming to produce SNG.

11 Claims, 4 Drawing Figures

PROCESS FOR MAKING SUBSTITUTE NATURAL GAS

This is a continuation of co-pending application Ser. No. 747,698, filed Dec. 6, 1976 now abandoned.

BACKGROUND OF THE INVENTION

This invention relates to the production of a substitute natural gas (SNG) from hydrocarbon oils derived from crude oil, oil shale, coal or other fossil fuels. The process of the invention involves the hydrogenation of a substantial proportion of the oil, suitably using either the non-catalytic processes of fluidised bed hydrogenation (FBH) or gas recycle hydrogenation (GRH). Both FBH and GRH are per se well known, and are described, for example in our United Kingdom patent specification Nos. 1219916, 119909, 11543211, 1133483, 1122426, 1085613, 1074932, 1031717, 1036890, 1031674, 899574, 873832 and 830960.

Natural gas is a highly desirable fuel because of its freedom from sulphur and its clean burning characteristics. Sulphur in certain fuels is a prime source of air pollution, since it produces noxious sulphur dioxide upon combustion. In view of the desirability of consuming natural gas for ecological and other reasons, it has been projected that there will be a shortage of this fuel in the future since its supply is, of course, limited. High quality natural gas has a calorific value of about 1000 Btu/standard cubic foot (BTU/scf). Various proposals have been made in recent years for providing a substitute natural gas, i.e. a manufactured gaseous fuel, which is completely interchangeable with natural gas. For example, U.S. Pat. No. 3,732,085 describes a process for converting crude oil to SNG by means of catalytic hydrocracking. However, the processes, both catalytic and non-catalytic, which have been proposed have limited application either due to their low thermal efficiencies or their restricted range of suitable feedstocks.

Generally, a wider range of feedstocks can be gasified in non-catalytic hydrogenation processes compared with catalytic hydrogenation processes because in the latter the catalysts are deactivated by materials in the feedstock such as metals, asphaltenes and resins. On the other hand, the use of non-catalytic processes can lead to relatively low thermal efficiencies due to the need to produce large amounts of hydrogen. In these schemes it is normally desirable to provide the required hydrogen by partial oxidation (POX), a process with a relatively low efficiency, so as to consume certain heavy fractions of the oil feedstock and oils produced from other process units. The purpose of this is to obtain complete feedstock utilization, allowing the lighter fractions to be gasified to methane.

Under comparable conditions, the ratio of hydrogen to oil feedstock fed to a thermal hydrogenator determines the amount of feedstock gasified, and to achieve the required degree of gasification it is necessary to supply hydrogenators like the FBH and GRH with a surplus of hydrogen over that required for reaction. The unreacted hydrogen has to be eliminated from the hydrogenated gas since it is unacceptable, except in small quantities, in SNG. Processes have been proposed in which this hydrogen is reacted usually in the presence of a catalyst, with carbon oxides and ethane in the hydrogenated gas to give methane. These processes are not very attractive for two reasons. Firstly, the reaction of carbon oxides and hydrogen (methanation) is very exothermic and must be conducted at low temperatures so that much low grade heat is released which is not readily recovered in a useful way. Secondly, the reaction of ethane and hydrogen suffers from the further disadvantage that the ethane is not then available to enrich the final gas to the calorific value (CV) specified for SNG. This is particularly disadvantageous in those situations where the specified CV is higher than that of pure methane, such is the case in the United Kingdom and Japan. It is thus an object of the present invention to reduce the amount of hydrogen produced and to conserve at least part of the ethane produced in the hydrogenator. It is another object of the present invention to provide such a process in which more efficient use is made of the hydrogen produced than hitherto.

SUMMARY OF THE PRESENT INVENTION

The present invention provides a process for the production of a substitute natural gas which process comprises the steps of
(a) Providing an oil having an initial boiling point of not less than about 200° C.
(b) Non-catalytically hydrogenating a part of the oil and recovering a product gas therefrom.
(c) Separating hydrogen from the gas produced in step (b).
(d) Recycling the hydrogen recovered in step (c) for re-use in the hydrogenation step (b).
(e) Forming an SNG from the product gas from step (c).
(f) Manufacturing hydrogen-containing gas to meet the requirements of the hydrogenation unit.

When the starting feedstock is a crude oil, step (a) may constitute a separation which may conveniently be affected by an atmospheric distillation unit arranged to give rise to a relatively volatile top fraction, a middle fraction and a bottom fraction. This top fraction may be converted by the catalytic rich gas (CRG) steam reforming process into an SNG as described in British Pat. No. 1271721.

More specifically, the top fraction may be a vaporisable cut having a final boiling point of not greater than about 200° C., the middle fraction may be a vaporisable cut having an initial boiling point of not less than about 200° C., and the bottom fraction may be non-vaporisable bottoms.

Step (b) is suitably performed by FBH or GRH with the production, in addition to a product gas, of an aromatic condensate and perhaps a carbonaceous residue. This aromatic condensate and carbonaceous residue, which contains a significant proportion of the feedstock sulphur, may either be subjected to partial oxidation (POX) with steam and oxygen to generated a hydrogen-containing gas for the hydrogenation step (b), or used as fuel to render the overall process thermally self sufficient, or more generally, both. To avoid using such sulphurous materials for plant fuel, all of it can be subjected to partial oxidation and some of the hydrogen-containing gas so made can be used for fuel after desulphurisation.

In another embodiment the oil provided in step (a) can be sent to a pressurised vaporiser in which some or all of the oil is vaporised, which can then be hydrogenated in, for example, a GRH reactor, and any residual oil is sent for use as POX feedstock or plant fuel as described above. Vaporisation can be enhanced by sparging hydrogen-containing gas into the vaporiser, the resultant hydrogenating gas/vapour overhead steam being suitable as a combined feedstock for a GRH reactor.

The FBH or GRH units may be operated according to the teachings in our aforementioned patent specifications. A GRH unit may be operated at temperatures up to about 950° C. or more using a vaporised feedstock.

Hydrogen separation in step (c) may be accomplished by absorbing some of the components of the gas using a suitable liquid or solid, and these gases are then desorbed into a different stream by lowering the pressure or raising the temperature or both (pressure/temperature swing sorption). Equally, other physical or chemical methods can be used, for example, as described in British patent specification No. 1171103 and Application No. 22773/73, but is preferably by means of a cryogenic plant in which components other than hydrogen are largely condensed out. Cryogenic plants are known per se; a suitable one is described below which divides the hydrogenation product gas into three streams, a methane-rich stream, a methane-ethane stream and a hydrogen-rich steam which is recycled to the FBH or GRH unit. The methane rich stream may be suitable as it stands or with minor adjustments for use as an SNG. The methane-ethane stream can be converted either separately or after combination with a relatively volatile top fraction, if present, from the original feedstock, to give a methane-rich gas. Sufficient ethane, if available, is allowed to pass into the final gas to control its CV to SNG specification.

The bottom fraction (if present) of the starting feedstock or other residue oils produced in process units may be used for any or all of three purposes: as a fuel for raising steam and power to render the overall process thermally self-sufficient; as an addition to the middle fraction feed to the FBH or GRH or similar units; or as feedstock to the POX unit.

The high temperature, non-catalytic POX involves the reaction of the oil feedstock with steam and oxygen to give a product gas comprising mainly carbon monoxide and hydrogen. Conventionally this gas has been subjected to a water gas shift reaction to increase the hydrogen content. According to a preferred feature of the present invention, the POX gas is subjected to less CO-shift reaction than conventionally or none at all, and the resulting gas is then treated by cryogenics, pressure/temperature swing sorption or other physical or chemical methods to give acceptably pure separated hydrogen, carbon monoxide and methane streams. The system chosen will depend on the POX gas composition and desired product purities. Advantageously, hydrogen separation may be effected by the same method as that used to recover hydrogen from the product gas from the FBH or GRH units. This feature allows the reduction in size or elimination of the conventional shift unit which is a source of inefficiency since the shift reaction is very exothermic and only low grade heat is recoverable after the reaction stage. In many ways the desirability of eliminating shift is akin to that of eliminating methanation as described above. This feature also allows the POX process to be operated more efficiently since there is no need to achieve the normal high reaction temperatures which are required to reduce the methane content of the product gas since any methane produced can be separated from the hydrogen and sent to the product SNG stream. The production of methane is much less endothermic than hydrogen production. Thus, in several ways the partial replacement of the shift stages by a gas separation unit saves steam and oxygen, leads to a higher overall thermal efficiency and can reduce the capital costs and possibly pressure losses.

The carbon monoxide stream produced from the treated POX gas can be used in the process in several ways. It is a very good fuel for gas turbines or boilers because of its high quality, being effectively free of sulphur, and its heat of combustion can be used efficiently leading to low stack losses since water is not a combustion product (net CV=gross cv). In this latter respect it is better than conventional low heating value guel gases, whether nitrogen containing producer gas or nitrogen free gas from POX or Lurgitype generators. Conventionally hydrogen in gases from fuel generators is wastefully burned instead of recovered for use in hydrogenation reactors. Also, if the process contains a catalytic gasification stage (for example CRG) to treat the light fraction of the feed, a considerable amount of carbon monoxide can be beneficially added to this stage. The benefits can be considered to arise because the carbon monoxide reacts with the excess steam, added in any event to ensure adequate catalyst performance, to give hydrogen by the exothermic shift reactions which aids the gasification of the light fractions. This can lead to improved catalyst perfromances and can allow the use of lower reactor inlet temperatures.

The process of the present invention offers the following advantages:

(1) Cryogenic or other means of separation of hydrogen can be preformed with high separation efficiency and with low energy consumption. By recycling hydrogen the amount of inefficient hydrogen production by POX and hydrogen elimination by methanation are both significantly reduced.

(2) The removal of hydrogen from the hydrogenated gas can in some instances result in gases which can be directly blended to give SNG without any further energy loss due to process inefficiencies. Equally, the conservation of ethane, if it is present in the hydrogenated gas, means that it can be used an an enrichment source and surplus ethane can be reacted to give methane.

It is sometimes advantageous to let a small amount of hydrogen leave in one of the methane-containing gases from the cryogenic unit, but the presence of hydrogen in the SNG must be controlled to avoid combustion problems with the final gas.

(3) By utilising hydrogen recirculation, the hydrogen to oil ratio in the hydrogenation reactor can be chosen to accommodate a wide range of feedstocks without significantly affecting the process efficiency, with little effect on the rate of hydrogen generation in the POX unit. This is a departure from previous precedents. The POX unit has only to produce hydrogen to make up that reacted in the FBH or GRH reactor and the small amount of hydrogen which is lost from the cryogenic system.

(4) The use of cryogenic or other methods of hydrogen recovery from POX gas is not an essential feature, but it fits in well with the overall process by increasing the efficiency of hydrogen production, by raising the hydrogen partial pressure in the hydrogenator so aiding gasification, and by providing a high quality fuel. Also, the consumption of more residual oil in POX to generate a given amount of hydrogen means that heavier oils can be totally gasified by these overall processes.

DESCRIPTION OF THE DRAWINGS

Reference is directed to the accompanying drawings in which.

DESCRIPTION OF THE PREFERRED EMBODIMENT

Figure 1:
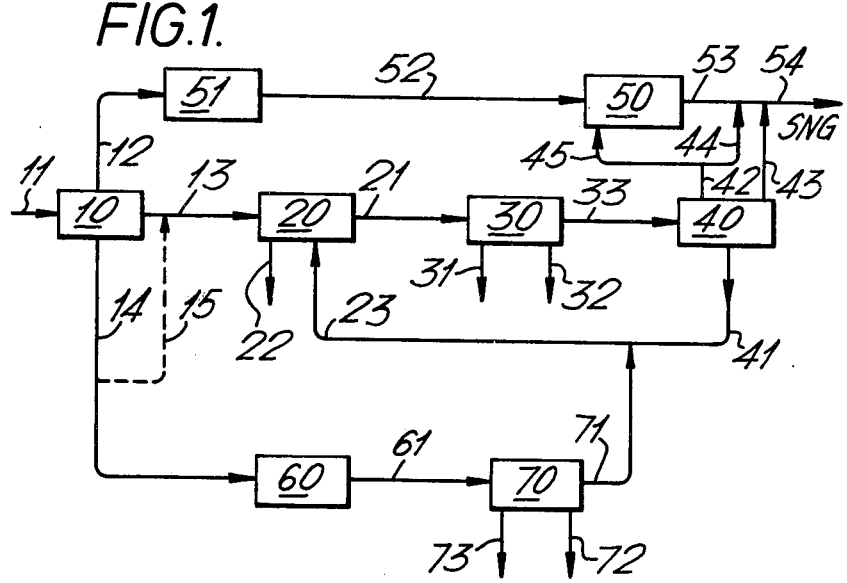
FIG. 1 is a flow diagram for an SNG plant for taking a whole crude oil feed.

Referring to FIG. 1, a whole crude oil feedstock is delivered from the off-site storage via line 11 and is split in the separation unit 10 into three streams. The lightest stream passes in line 12 to the purification unit 51. The middle fraction passes to the hydrogenation unit 20 by line 13. After preheating and mixing with all or part of the hydrogenating gas which enters via line 23 the oil is gasified by either the FBH or GRH process to give a crude gas which leaves via line 21 and perhaps also a carbonaceous residue extracted in line 22. The crude gas is treated in unit 30 producing a purified gas which is sent to the separation unit 40 via line 33. The treatment unit also recovers aromatic condensate which is sent via line 31 to be used for either plant fuel or for POX feed or other uses. A separated acid gas stream 32 is sent to a treatment unit (not shown) for sulphur recovery. The purified product gas from the hydrogenator, now consisting essentially of hydrogen, methane and ethane is separated into the three streams in the cryogenic unit 40 to be described in detail below with reference to FIG. 4 of the drawings. Three streams emerge from the cryogenic unit 40: a stream 41 contains about 90% hydrogen to be recycled to the hydrogenation unit 20, a stream comprising mainly methane is sent via line 43 to the line 54 through which flows the product SNG, and a third stream 42 is a stream comprising ethane and methane which is divided into two parts. A portion is sent via line 44 into line 54 to raise the CV of the product to the required value whilst the remainder is sent via line 45 to the gasification unit 50. This unit also treats, by a steam reforming process like the catalytic rich gas process (CRG), the purified top fraction from unit 50 which enters via line 52; the product gas emerging from line 53 is mixed with streams 44 and 43 to give SNG.

The bottom fraction from unit 10 is passed via line 14 to a POX unit 60 to be gasified with steam and oxygen. Carbon entrained in the gas stream is removed in a carbon scrubber (not shown), mixed with feedstock and oil and the resulting slurry recycled to the POX reactor. The POX gas is passed via line 61 to unit 70 where, after purification, a portion is sent via line 73 for use as plant fuel and the remainder catalytically reacted with steam to give a gas with a much higher hydrogen to carbon monoxide ratio. The unit also produces a stream 72 of hydrogen sulphide and carbon dioxide removed from the POX gas within the unit and is sent to a sulphur recovery unit (not shown). The hydrogen containing gas is sent via line 71 and line 23 to the hydrogenation unit 20 to achieve plant balance and eliminate oil by-products, it is sometimes necessary to send part of the bottom fraction via line 15 to the hydrogasification unit 20. Units for producing the various utilities required, for example, steam, oxygen electricity, motive power, etc. are not shown, nor are minor streams such as that for hydrogenating gas to the purification unit 51. These utilities are generated in a central power plant fuelled by POX gas, carbonaceous residue from stream 22, condensate from stream 31 and, if necessary, the bottom fraction from unit 10. Also, some of the units described export energy (mainly derived from wast heat) which is used in other units, so the whole process is highly integrated.

Figure 2:
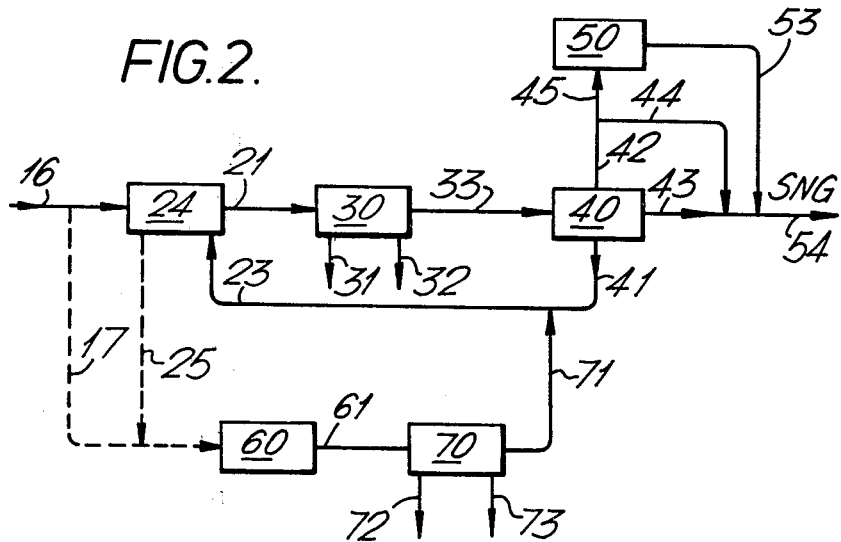
FIG. 2 is a flow diagram for an SNG plant for taking a residuum feed.

The flow diagram of FIG. 2 is similar to that of FIG. 1. In these diagrams, and in FIG. 3, like numerals designate like features. A description of these similar parts will not be repeated. In FIG. 2 a residual oil fed via line 16 is sent to unit 24 which incorporates a hydrogenation reactor. The non-gasified residue is passed by line 25 to the POX unit 60. The gas produced leaves via line 21 to the treatment unit 30. Unit 50 in this figure only treats a part of the ethane-methane stream from unit 40 since the feedstock contains in significant amount of light fractions. Clearly, if the hydrogenation reactor in unit 24 operates under such conditions that little ethane is preserved in stream 21, then unit 50 is omitted. The oil feed to unit 60 is delivered via line 25 as a by-product of unit 24 and via line 17 as a part of the residual oil feedstock.

Figure 3:
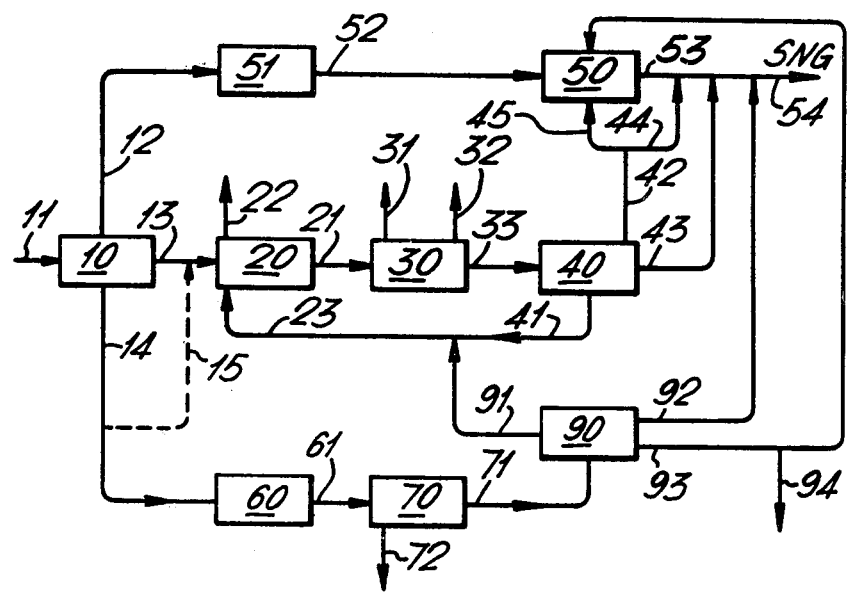
FIG. 3 is a flow diagram for an SNG plant for taking a crude oil feed with modified POX gas treatment, and, FIG. 4 is a more detailed flow diagram of the cryogenic unit outlined in FIGS. 2 and 3.

FIG. 3 shows a flow diagram for treating a whole crude and is similar to FIG. 1 except in the way the gas from unit 60 is treated. Here the POX gas is passed to unit 70 from which, after purification and perhaps a small amount of CO shift, a gas stream emerges via line 71. This gas will have a lower hydrogen to carbon monoxide ratio than that from unit 70 in FIGS. 1 and 2, and its methane content is not critical; so that the operation of the POX unit is less critical.

Stream 71 passes to a cryogenic separation unit 90 from which emerges 3 streams. A hydrogen rich stream is sent via line 91 and line 23 to unit 20; a methane rich stream is sent via line 92 to be blended with the product SNG; and a carbon monoxide rich stream 93 is sent to the gasification unit 50 except for that portion which is sent via line 94 for use as plant fuel. In fact, units 40 and 90 can be combined with output streams of similar composition, such as 91 and 41, joined together. It is also possible for common elements of units 30 and 70 to be combined.

Figure 4:
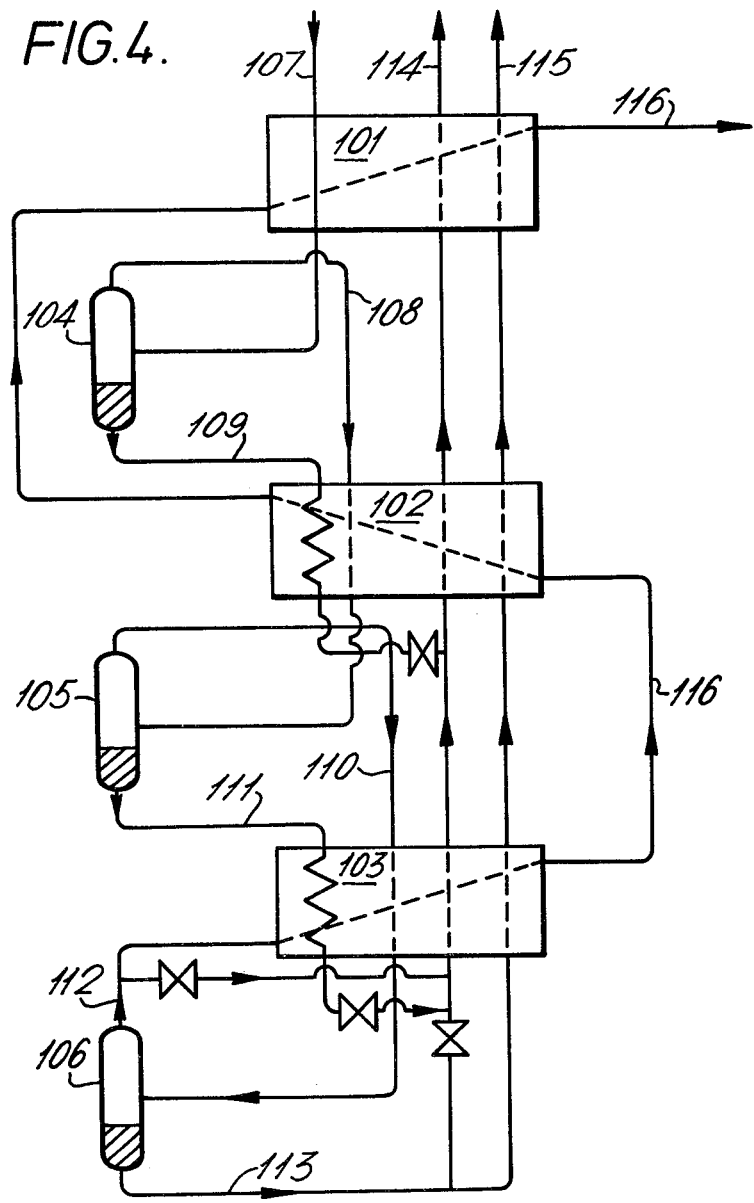

Reference is now made to FIG. 4 which shows the process diagram for unit 40 of FIG. 1.

The cryogenic unit basically consists of three heat exchangers 101, 102 and 103 arranged in series with interstage separators 104, 105 and 106 on the cooled gas stream leaving each of the exchangers. Feed gas is delivered in line 107 and enters exchanger 101 at a pressure of 550 psia and is cooled to approximately $-70°$ C. (this temperature ranges from $-60°$ C. to $-75°$ C. depending on feed composition). At the outlet of exchanger 101 the vapour and liquid fractions are separated in vessel 104 and each passes in streams 108 and 109 respectively to exchanger 102 where they are independently cooled to about $-90°$ C. Stream 108 passes from this exchanger as a partially condensed vapour into separator 105 from which the vapour stream 110 and liquid stream 111 are again separately cooled in exchanger 103 to about $-155°$ C., after which stream 110 is passed to separator 106 in which its vapour and liquid conponents are separated.

Vapour from separator 106 being 90% hydrogen with nitrogen, carbon monoxide and methane as contaminants leaves in stream 112; the liquid is mainly methane which leaves in stream 113. Liquid from separator 104 leaves in stream 109 and is cooled in exchanger 102 to −90° C. and the liquid from separator 105 in line 111 is further cooled in exchanger 103 to −155° C.

Cooling for the process is obtained by expanding into line 114 from a mixture of the cooled liquid from separator 105 in line 111, between 10 and 20% of the stream 113 containing mostly methane from separator 106, and about 2% of stream 112 containing mainly hydrogen from separator 106 being jointly expanded to 50 psia and passed back into the cold end of exchanger 103. Addition of 2% hydrogen has the effect of increasing the cold end temperature driving force. The mixture vaporises, and gives up its refrigeration to the incoming condensing feed gas in line 110, and the warmed refrigerant from exchanger 103 is then joined by the condensed liquid fraction separated in separator 104 and sub-cooled in exchanger 102. This mixture is then passed through the cold ends of exchangers 102 and 101 to effect further cooling.

Additional refrigeration is obtained by warming up the bulk of the methane fraction in line 115 from separator 106 through exchangers 103, 102 and 101 respectively. The hydrogen stream from separator 106 is similarly warmed in a separate channel leaving the unit in line 116 at high pressure. Heat exchangers proposed for cooling duty are brazed aluminium fin-plate type. The operating pressure of this equipment can be to a maximum of 750 psia, with all cold box equipment constructed of aluminum and stainless steel. Stream 114 which leaves the unit at low pressure comprising mainly methane and ethane. Stream 115 leaves at high pressure comprises mainly methane.

Since the methane/ethane fraction leaves the cold box in stream 114 at a pressure of about 40 psia, it has to be recompressed to a final discharge pressure of 500 psia in a multi-stage centrifugal compressor with interstage cooling.

Example 1

An Arabian light crude oil was treated by the process of this invention as shown in FIG. 1. The feedstock and product data are shown in the following Table I.

Table I

| Feedstock Data | |
|---|---|
| Feedstock Flow: | 1,243,750 lb/hr (100,000 barrels/stream day) |
| Feedstock Type: | Arabian Light Crude Oil |
| | Gravity 34.1 °API |
| | C/H 6.71 |
| | S 1.70 % WT |
| | HCV 19440 Btu/lb |
| Product Data | |
| Final SNG gas composition | |
| Output (MMSCFD) 470 | |
| Analysis (% Vol) | |
| $H_2$ | 2.4 |
| $H_2$ + A | 0.1 |
| $CO_2$ | 0.6 |
| CO | 0.6 |
| $CH_4$ | 90.2 |
| $C_2H_6$ | 6.0 |
| $C_2H_4$ | 0.1 |
| HCV (Btu scf) | 1029 |
| Overall thermal efficiency (%) | 83.2 |

The gross calorific value of the gas is based on the following data:
1 lb. mole = 379.1 scf (standard cubic feet)

A similar process was used to treat the same feedstock, but without recovery of the hydrogen in unit 40, but in this case the purified gas from unit 30 was sent to a catalytic unit as unit as described in British Pat. No. 1299452.

Because the ethane in the gas was reacted the product SNG had a lower CV of 1000 Btu/scf and the overall thermal efficiency of the process was only 79.3% due mainly to the larger POX unit and increased amount of methanation.

Example 2

An SNG was produced by the process shown in FIG. 2 from a Tia Juana residuum produced by the atmospheric distillation of the whole crude oil. Part of the oil was sent via line 17 to the POX unit 60 and the remainder to the hydrogenation unit 24. The hydrogenation unit was an FBH. The feedstock and product data are shown in the following Table II.

Table II

| Feedstock Data | |
|---|---|
| Feedstock flow: | 1,407,980 lb/hr (100,000 BPSD) |
| Feedstock type: | Tia Juana Residumm Oil |
| | Gravity 15.30°API |
| | C/H 7.60 |
| | S 2.30% |
| | HCV 18,900 Btu/lb |
| Product Data | |
| Final SNG gas composition | % Vol |
| $H_2$ | 3.1 |
| $CH_4$ | 84.7 |
| $C_2H_6$ | 9.2 |
| $C_2H_4$ | 0.1 |
| CO | 1.8 |
| $CO_2$ | 1.0 |
| $N_2$ + A | 0.1 |
| HCV (Btu/scf) | 1035 |
| SNG product output | 477 MM scfd |
| Overall refinery efficiency | 77.2% |

Example 3

This is an example which illustrates the advantages bestowed by the embodiment of the invention shown in FIG. 3 in that the partial oxidation unit 60 need not operate at such high temperatures as required to give a gas with a low methane content.

The following Table shows the composition of the gases from the POX unit operating under conventional conditions and under conditions which promote the formation of methane.

Table III

| | Conventional POX Gas | Methane Rich POX Gas |
|---|---|---|
| CO | 47.3 | 14.1 |
| $H_2$ | 47.3 | 32.0 |
| $CH_4$ | 0.5 | 18.7 |
| $CO_2$ | 4.9 | 35.2 |
| Volume produced (Scf/lb feed) | 50.6 | 38.4 |

We claim:
1. A process for producing substitute natural gas (SNG) without employing a water gas shift step comprising:
providing a crude oil;
subjecting said oil to a fractionation to produce therefrom
(a) a first vaporisable cut having a final boiling point of not greater than about 200° C.,

(b) a second vaporisable cut having an initial boiling point of not less than about 200° C., and (c) non-vaporisable bottoms;

non-catalytically hydrogenating at least a portion of said second cut to produce a first gas containing hydrogen, methane and ethane;

removing methane and ethane from said first gas to produce a first hydrogen stream;

subjecting said bottoms to partial oxidation to produce a second gas containing hydrogen, methane and carbon monoxide;

removing methane and carbon monoxide from said second gas to produce a second hydrogen stream;

using said first and second hydrogen streams in said hydrogenating step;

catalytically reforming said first vaporisable cut in the presence of carbon monoxide removed from said second gas to produce a methane-rich gas; and forming SNG from the methane rich gas and from the methane and ethane removed from said first gas.

2. A process as set forth in claim 1 wherein is included the step of forming SNG from the methane removed from said second gas.

3. A process as set forth in claim 1 wherein said step of removing methane and carbon monoxide from said second gas is effected cryogenically by condensation of components other than hydrogen.

4. A process as set forth in claim 1 wherein said step of removing methane and ethane from said first gas is effected cryogenically by condensation of components other than hydrogen.

5. A process as set forth in claim 3 wherein said step of removing methane and ethane from said first gas is effected cryogenically by condensation of components other than hydrogen.

6. The process as set forth in claim 5 wherein said cryogenic removal steps are effected in a single cryogenic unit with said first and second hydrogen streams being joined together to present a single hydrogenating gas stream.

7. A process as set forth in claim 1 wherein said removing steps are conducted in a single combined unit which said first and second hydrogen streams joined together to present a single hydrogenating gas stream.

8. A process as set forth in claim 1 wherein said non-catalytic hydrogenation is carried out at a temperature up to about 950° C.

9. A process for producing substitute natural gas (SNG) without employing a water gas shift step comprising:

providing a crude oil;

subjecting said oil to a fractionation process to produce therefrom (a) a first vaporisable cut having a final boiling point of not greater than about 200° C., (b) a second vaporisable cut having an initial boiling point of not less than about 200° C., and (c) non-vaporisable bottoms;

non-catalytically hydrogenating at least a portion of said second cut to produce a first gas containing hydrogen, methane and ethane;

separating hydrogen from said first gas and recycling said separated hydrogen for use in non-catalytically hydrogenating the portion of said second cut, subjecting said bottoms to partial oxidation to produce a second gas containing hydrogen and carbon monoxide;

removing carbon monoxide from said second gas to produce a third gas containing hydrogen;

using said third gas in said hydrogenating step;

catalytically reforming said first vaporisable cut in the presence of carbon monoxide removed from said second gas to produce a methane-rich gas; and forming SNG from the methane-rich gas and from the methane and ethane in said first gas.

10. A process as set forth in claim 9 wherein said step of removing carbon monoxide from said second gas is effected cryogenically by condensation of components other than hydrogen.

11. A process as set forth in claim 9 wherein said non-catalytic hydrogenation is carried out at a temperature up to about 950° C.

* * * * *